Feb. 9, 1954
W. E. PFEFFER
2,668,945
ELECTRICAL MEASURING INSTRUMENT WITH
PERMANENT MAGNET RESTORING MEANS
Filed April 25, 1950
2 Sheets—Sheet 1
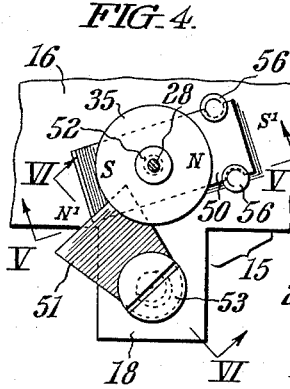
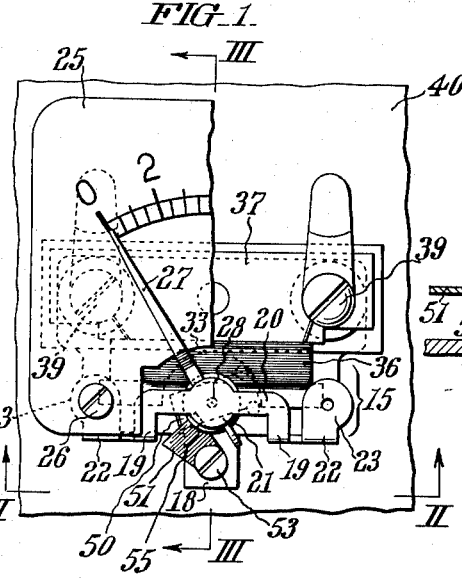
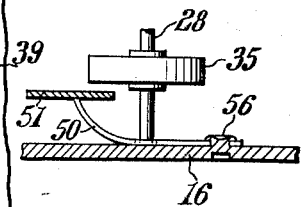
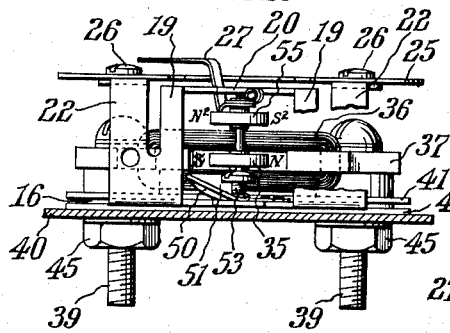
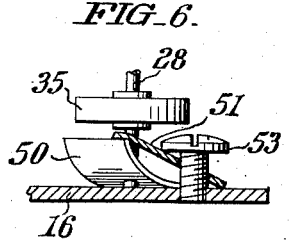
INVENTOR:
William E. Pfeffer
BY Paul & Paul
ATTORNEYS.

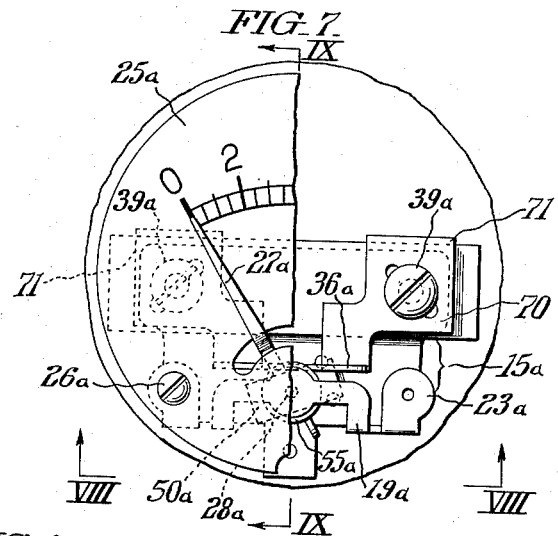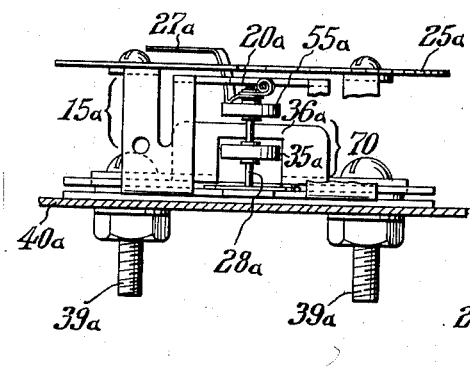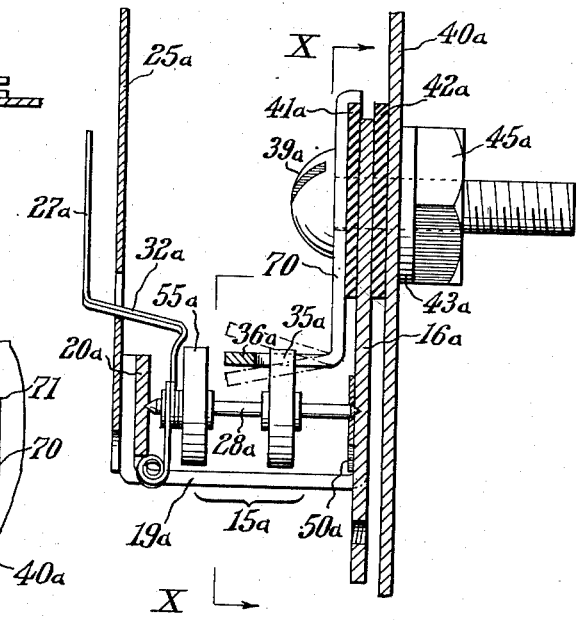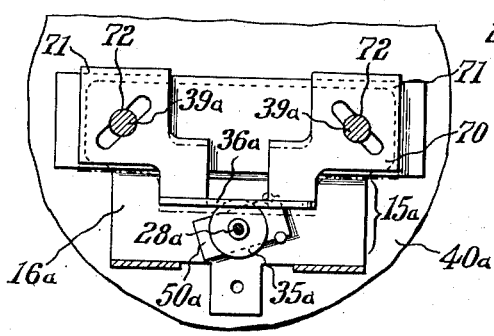

Patented Feb. 9, 1954

2,668,945

UNITED STATES PATENT OFFICE 2,668,945

ELECTRICAL MEASURING INSTRUMENT WITH PERMANENT MAGNET RESTORING MEANS

William E. Pfeffer, Perkasie, Pa., assignor to Paul Mood, Lester Void, and William E. Pfeffer, trading under the name of The Electro-Mechanical Instrument Company, Perkasie, Pa., copartners Application April 25, 1950, Serial No. 157,916

4 Claims. (Cl. 324—146)

This invention relates to electrical measuring instruments. More particularly, it has reference to voltmeters and/or ammeters of the type disclosed in U. S. Patent No. 2,446,431 granted to me on August 3, 1948, wherein a permanent disk magnet on an arbor reacts with flux from a coil through which the current to be measured is passed in producing the torque for moving an indication pointer over a fixed graduated dial, and wherein a stationary restoring magnet in turn reacts upon the flux of the arbor magnet to yieldingly maintain the pointer normally in zero position.

The chief aim of my present invention is to secure the advantages of greater structural simplification in electrical measuring instruments of the kind referred to, more especially as regards the formation of the restoring magnets and the facilities for adjusting them in calibrating the instruments.

Other objects and attendant advantages will appear from the following detailed description of the attached drawings, whereof:

Fig. 1 shows the front elevation of an electric measuring instrument in the form of a voltmeter conveniently embodying my invention, a portion of its dial having been broken away to expose important features which would otherwise be hidden.

Fig. 2 is a horizontal sectional view taken as indicated by the angled arrows II—II in Fig. 1.

Fig. 3 is a vertical section taken as indicated by the angled arrows III—III in Fig. 1 and drawn to a larger scale.

Fig. 4 is a fragmentary view in section taken as indicated by the angled arrows IV—IV in Fig. 3.

Figs. 5 and 6 are fragmentary views in section taken as indicated respectively by the angled arrows V—V and VI—VI in Fig. 4.

Figs. 7, 8 and 9 are views corresponding to Figs. 1, 2 and 3 of an electrical instrument in the form of an ammeter conveniently embodying my invention, Figs. 8 and 9 being sections taken as indicated respectively by the angled arrows VIII—VIII and IX—IX in Fig. 7; and Fig. 10 is a fragmentary view taken as indicated by the angled arrows X—X in Fig. 9.

As in my previous patent, the electric measuring instrument illustrated in Figs. 1-6 has a frame member 15 which is fashioned from stiff non-magnetic sheet metal with a back portion 16 having a medial pendent lug 18. The forwardly extending bracket arms 19 of the frame member 15 are turned up at their outer ends and connected by a cross bar 20 with a circular bearing enlargement 21 at the center. The outer supplemental bracket arms 22 of the frame member 15 terminate in upturned ears 23 which are drilled and tapped to receive the securing screws 26 for the dial 25. The coordinative pointer, designated 27, is affixed to an arbor 28 with pointed ends engaged in spot bearing indentations 29 and 30 respectively in the back portion 16 of the frame member 15 and in the central enlargement 21 of the cross bar 20. The pointer 27 is outwardly offset as at 32 to extend through an arcuate cutout 33 in the bottom of dial 25 to the front of the latter. Affixed to the arbor 28 at about the center is a permanent disk magnet 35 with a circumferential portion thereof extending into the hollow of a coil 36 which is wound on a support 37 of insulation, and which has its ends respectively connected to screws 39. These screws serve both as line conductor terminals and, in conjunction with the nuts at 45, as means for securing the frame member 15 and the coil support 37 within a protective casing or to an instrument panel such as indicated at 49. Thin strips 41, 42 and a washer 43 of insulation, prevent metallic contact between the frame member 15 and the panel 40, and between the latter two and the screws 39.

In the operation of the instrument, the magnetic field set up by current flow through the coil 36 reacts upon the fields of the disk magnet 35 on the arbor 28, with the result that the pointer 27 is moved clockwise in Fig. 1 across the dial 25 to indicate the voltage strength of the current, the movement being limited by the restraining effect of a restoring magnet 50 affixed to the back portion 16 of the frame member 15. For the more ready understanding of the operation of the instrument, the poles of the magnet elements 35 and 50 have been indicated respectively at N, S; N', S' in Figs. 2 and 4.

In accordance with my present invention, the restoring magnet 50 is fashioned to oblong configuration from thin sheet steel or the like capable of retaining its magnetism, and disposed diametrically of the axis of the arbor 28 as best seen in Fig. 4. As shown, the magnet strip 50 is provided with an aperture 52 for free passage of the arbor 28 through it, and is held in place by spot offsets 56 on the back portion 16 of bracket member 15 which are headed over the side edges of said strip adjacent one end thereof. In the present instance, the other or free end of magnet 50 is bent or curved upwardly toward the S pole of disk 35, see Figs. 5 and 6, with one corner of its upturned edge overlapped by a depressing finger 51 struck from non-magnetic metal, said finger having a large hole for penetration by the shank of a headed adjusting screw 53 threadedly engaged in the pendent lug 18 on the back portion 16 of frame member 15. By turning the screw 53 in one direction the N' pole end of restoring magnet 50 will be brought closer to the S pole of disk 35. On the other hand, by turning the screw 53 in the opposite direction, the N' pole of restoring magnet 50 will be moved further away from the S pole of disk 35. The restraining force of the restoring magnet 50 upon the pointer 27 can thus be very accurately regulated for the purpose of calibrating the instrument after assembly at the factory. The shape or configuration of the scale on dial 25, and the sensitivity of the instrument either at the lower or upper end of the scale, can be altered in accordance with my invention by positioning the restoring magnet 50 in different angular positions relative to the coil 36. This is accomplished in practice by changing the location of the extruded securing projections 56 of frame member 15 angularly about the axis of the arbor 28 in a manner readily understood from Fig. 4. The feature just described has proven advantageous to battery charger applications of the instruments.

In order to prevent affectation of the instrument by stray magnetic fields, a second magnet disk 55, with its poles oppositely arranged to those of the first mentioned arbor magnet, is affixed to the arbor 28 immediately to the rear of the pointer 27 and outside of the coil 36. This disk 55 may of course be omitted in instances where the stray magnetic fields are not of such magnitude as to interfere with the practical use of the instrument.

In the ammeter illustrated in Figs. 7–10, the coil 36a is constituted by a central single loop lateral yoke offset of a bracket like element 70 of pliant metal with upstanding lugs 71 at opposite ends thereof which are apertured as at 72 for passage of the shanks of the terminal screws 39a. The restoring magnet 50a in this instance is not curved or bent and lies perfectly flat against the back portion 16a of the frame member 15a, calibration being here effected by bending the coil portion 36a of the element 70 either up or down relative to the disk 35a on arbor 28a as desired or required, and as indicated in dash and dot lines in Fig. 9. All the other component elements not particularly referred to in Figs. 7–10 but having their counterparts in Figs. 1–6, are identified by the same reference numerals previously employed with the addition, in each instance, of the letter "a" for the purpose of more ready distinction.

Having thus described my invention, I claim:

1. In an electrical measuring instrument, a pointer carrying arbor; a frame affording journal support for opposite ends of the arbor; a permanent disk magnet on the arbor; a hollow coil, into which the arbor magnet projects endwise, stationarily supported by the frame; a permanent restoring magnet fashioned from flat metallic strip material, one pole end thereof being affixed to the frame and the other pole end thereof being bent outward relative to the frame and extending into proximate relation to one side face of the arbor magnet; and a second permanent disk magnet on the arbor beyond the coil, spaced from the other side face of the first mentioned arbor magnet with its poles oppositely arranged relative to those of said first mentioned arbor magnet.

2. An electrical measuring instrument according to claim 1, further including means for adjusting the free pole end of the restoring magnet toward and away from the first mentioned arbor magnet.

3. An electrical measuring instrument according to claim 2, further including an inclined finger of non-magnetic material with one end bearing against the frame and the other end overreaching the free pole end of the restoring magnet, and a headed adjusting screw with its shank passing freely through an aperture in the finger and engaging into said frame.

4. An electrical measuring instrument according to claim 1, wherein the coil is in the form of a loop of pliant metal connected to and extending laterally from the frame, said loop being bendable in the direction of the arbor axis to vary the effect of its flux upon the first mentioned arbor magnet.

WILLIAM E. PFEFFER.

References Cited in the file of this patent

UNITED STATES PATENTS

| Number | Name | Date |
|--------|------|------|
| 371,720 | Waddell | Oct. 18, 1887 |
| 1,398,595 | Hoyt | Nov. 29, 1921 |
| 1,754,085 | Faus | Apr. 8, 1930 |
| 1,761,917 | Helgeby | June 3, 1930 |
| 2,002,445 | Arey et al. | May 21, 1935 |
| 2,102,409 | Faus | Dec. 14, 1937 |
| 2,183,685 | Lingg | Dec. 19, 1939 |
| 2,446,431 | Pfeffer | Aug. 3, 1948 |
| 2,484,567 | Hoare | Oct. 11, 1949 |